(12) United States Patent
Li et al.

(10) Patent No.: US 11,735,831 B2
(45) Date of Patent: Aug. 22, 2023

(54) BROADBAND MIMO ANTENNA WITH SELF-DECOUPLING CHARACTERISTICS

(71) Applicant: Xi'an University of Posts & Telecommunications, Xi'an (CN)

(72) Inventors: Qian Li, Xi'an (CN); Zhong Yu, Xi'an (CN); Jun Zhang, Xi'an (CN)

(73) Assignee: XI'AN UNIVERSITY OF POSTS & TELECOMMUNICATIONS, Xi'an (CN)

( * ) Notice: Subject to any disclaimer, the term of this patent is extended or adjusted under 35 U.S.C. 154(b) by 57 days.

(21) Appl. No.: 17/539,227

(22) Filed: Dec. 1, 2021

(65) Prior Publication Data

US 2023/0138099 A1 May 4, 2023

(30) Foreign Application Priority Data

Nov. 3, 2021 (CN) .......................... 202111293663.3

(51) Int. Cl.
| | | |
|---|---|---|
| *H01Q 13/08* | (2006.01) | |
| *H01Q 21/20* | (2006.01) | |
| *H01Q 21/22* | (2006.01) | |
| *H01Q 1/38* | (2006.01) | |
| *H01Q 13/10* | (2006.01) | |
| *H01Q 21/06* | (2006.01) | |

(52) U.S. Cl.
CPC ............... *H01Q 21/22* (2013.01); *H01Q 1/38* (2013.01); *H01Q 13/106* (2013.01); *H01Q 21/064* (2013.01)

(58) Field of Classification Search
CPC .................................................. H01Q 13/085

USPC ......................................................... 343/702
See application file for complete search history.

(56) References Cited

U.S. PATENT DOCUMENTS

| | | | |
|---|---|---|---|
| 5,160,906 A | 11/1992 | Siomkos et al. | |
| 11,251,541 B2 * | 2/2022 | Luo ......... | H01Q 13/06 |
| 2003/0095073 A1* | 5/2003 | Thudor ............ | H01Q 3/242 |
| | | | 343/768 |
| 2010/0238084 A1 | 9/2010 | Deng et al. | |

(Continued)

FOREIGN PATENT DOCUMENTS

| | | |
|---|---|---|
| CN | 102723601 A | 10/2012 |
| CN | 103094683 A | 5/2013 |
| CN | 104681971 A | 6/2015 |

(Continued)

*Primary Examiner* — Dimary S Lopez Cruz
*Assistant Examiner* — Brandon Sean Woods
(74) *Attorney, Agent, or Firm* — WPAT, PC

(57) ABSTRACT

A broadband multiple-input multiple-output (MIMO) antenna with self-decoupling characteristics includes: a dielectric substrate, a metal patch printed on an upper surface of the dielectric substrate, and a pair of horizontal back-to-back elliptical tapered slots and a vertical elliptical tapered slot etched on the metal patch. A microstrip line and another bent micro strip line are respectively used to feed the vertical elliptical tapered slot and the pair of horizontal elliptical tapered slots, and characteristic modes of the horizontal slots excited by the bent microstrip line and characteristic modes of the vertical slot excited by the micro strip line are mutually orthogonal. By adopting the technical scheme, no additional decoupling structure needs to be introduced, and lower coupling can be realized in a wider working frequency band.

8 Claims, 6 Drawing Sheets

(56) References Cited

U.S. PATENT DOCUMENTS

2020/0161774 A1* 5/2020 Carlson ................ H01Q 13/085

FOREIGN PATENT DOCUMENTS

| CN | 204516896 U | 7/2015 |
| CN | 110165404 A | 8/2019 |
| CN | 111224238 A | 6/2020 |
| CN | 111541016 A | 8/2020 |
| CN | 113571890 A | 10/2021 |

* cited by examiner

BROADBAND MIMO ANTENNA WITH SELF-DECOUPLING CHARACTERISTICS

TECHNICAL FIELD

The invention belongs to the technical field of antennas, particularly to a self-decoupling miniaturized broadband (also referred to as wideband) multiple-input multiple-output (MIMO) antenna.

BACKGROUND

Multiple-input multiple-output (MIMO) technology is one of the key technologies of the fifth-generation communication system. MIMO greatly improves the spectrum utilization rate and channel capacity without increasing the bandwidth and antenna transmission power. However, in a MIMO antenna system, the coupling between antenna units will affect the performance of the antenna. In order to reduce the coupling between antenna units, researchers have proposed a variety of technical schemes. Currently, these solutions can be classified into the following three categories. The first type is to introduce a new coupling path to offset the original coupling between the two antenna units. At present, the neutralization line technology and the introduction of decoupling units are widely used, but the clear design for this type is not available and this type is difficult to apply to the coupling reduction between the broadband antenna units; the second type is to block the coupling path between the antenna units by introducing some band-stop structures, such as defective ground structures and electromagnetic band gap structures, etc. In this way, lower coupling between the antenna units is achieved, but the disadvantage of the second type is that the volume is relatively large, and the addition of the decoupling structure will have a negative impact on the efficiency of the antenna. The above two types of coupling reduction methods require the introduction of additional decoupling structures, and increase the complexity and volume of the antenna structure, not conducive to the miniaturized design of the antenna system. In order to solve the above problems, the researchers propose a third type of self-decoupling method, which takes advantage of the inherent decoupling characteristics of mode to achieve a lower coupling between MIMO antenna units without any additional decoupling structure. However, many self-decoupled MIMO antennas currently have problems, such as narrow working bandwidth and large sizes.

SUMMARY

A technical scheme proposed by the invention is to provide a miniaturized broadband MIMO antenna that does not need to introduce an additional decoupling structure and can achieve lower coupling in a wider operating frequency band.

In order to achieve the above objectives, the invention adopts the following technical solutions:

A broadband MIMO antenna with self-decoupling characteristics, comprising a dielectric substrate, a metal patch, a first microstrip feeder and a second microstrip feeder; the upper surface of the dielectric substrate is printed with the metal patch, the metal patch is formed by etching a circular metal patch to be with three elliptical tapered slots and three L-shaped slots; the lower surface of the dielectric substrate is printed with the first microstrip feeder and the second microstrip feeder which are of non-uniform width.

Preferably, the three elliptical tapered slots include a first elliptical tapered slot, a second elliptical tapered slot, and a third elliptical tapered slot; the central axis of the first elliptical tapered slot and the second elliptical tapered slot are located on the horizontal central axis of the metal patch, and the third elliptical tapered slot is located on the vertical central axis of the metal patch.

Preferably, the three L-shaped slots include a first L-shaped slot, a second L-shaped slot, and a third L-shaped slot; the first L-shaped slot is connected to the third elliptical tapered slot, the first L-shaped slot is located in the left of the third elliptical tapered slot, the first L-shaped slot is comprised of a first horizontal rectangular slot and a first vertical rectangular slot that are connected in sequence, and the first vertical rectangular slot is located on the left side of the first horizontal rectangular slot; the second L-shaped slot is composed of a second horizontal rectangular slot and a second vertical rectangular slot that are sequentially connected, and the second vertical rectangular slot is located on the right side of the second horizontal rectangular slot; the third L-shaped slot and the second L-shaped slot are symmetrically distributed about the vertical central axis of the metal patch, and the third L-shaped slot is composed of a third horizontal rectangular slot and a third vertical rectangular slot; the first horizontal rectangular slot of the first L-shaped slot, the second vertical rectangular slot of the second L-shaped slot, and the third vertical rectangular slot of the third L-shaped slot have the same width and length, and the first vertical rectangular slot of the first L-shaped slot, the second horizontal rectangular slot of the second L-shaped slot, and the third horizontal rectangular slot of the third L-shaped slot have the same width and length.

Preferably, the first microstrip feeder includes a first horizontal rectangular micro strip patch, a second horizontal rectangular micro strip patch, and a third horizontal rectangular microstrip patch connected in sequence; wherein the second horizontal rectangular microstrip patch is used to connect the first horizontal rectangular microstrip patch and the third horizontal rectangular microstrip patch with the same width.

Preferably, the second micro strip feeder includes a first vertical rectangular micro strip patch, a second horizontal rectangular micro strip patch, a third vertical rectangular micro strip patch, and a fourth horizontal rectangular micro strip patch, a fifth vertical rectangular micro strip patch, a sixth horizontal rectangular micro strip patch, and a seventh vertical rectangular microstrip patch connected in sequence; the first vertical rectangular micro strip patch and the seventh vertical rectangular micro strip patch have the same length and width, the second horizontal rectangular micro strip patch, the third vertical rectangular micro strip patch, the fourth horizontal rectangular micro strip patch, the fifth vertical rectangular micro strip patch, and the sixth horizontal rectangular microstrip patch have the same width, the second horizontal rectangular microstrip patch and the sixth horizontal rectangular micro strip patch have the same length, and the third vertical rectangular micro strip patch and the fifth vertical rectangular micro strip patch have the same length.

Preferably, the first micro strip feeder excites the vertically placed elliptical tapered slot through coupling feed; the second micro strip feeder excites a pair of back-to-back elliptical tapered slots which are horizontally placed.

Preferably, the material of the dielectric substrate 1 is Rogers RO4350B, the relative dielectric constant is $\varepsilon=3.66$, and the thickness $h=0.508$ mm.

Preferably, R1 is 29.5-32.5 mm; W1 is 62-70 mm; L1 is 65-75 mm; RR2 is 10-29 mm; RR1 is 18.3-28.3 mm; S1 is 0.6-1.5 mm; LL1 is 5-18 mm; LL2 is 10-18 mm; S2 is 0.5-1.5 mm; S3 is 0.5-1.5 mm; M1 is 4-12 mm; M2 is 0.5-1.5 mm; M3 is 5-12 mm; M4 is 1-2 mm; M5 is 4-8 mm; M6 is 1-2 mm; T1 is 16.3-22.3 mm; T2 is 7-13 mm; T3 is 10.5-13.9 mm; T4 is 0.1-0.5 mm; T5 is 0.3-1 mm; T6 is 10-20 mm; among them, R1 is the radius of the metal patch; W1 is the width of the dielectric substrate; L1 is the length of the dielectric substrate; RR2 is the short radius of the elliptical slots; RR1 is the long radius of the elliptical slots; S1 is the half of the initial distance of the elliptical tapered slots; LL1 is the length of the horizontal rectangular slot of the first L-shaped slot; LL2 is the length of the vertical rectangular slot of the first L-shaped slot; S2 is the width of the horizontal rectangle of the first L-shaped slot; S3 is the width of the vertical rectangular groove of the first L-shaped slot; M1 is the length of the second horizontal rectangular patch in the first microstrip feeder; M2 is the width of the second horizontal rectangular patch in the first microstrip feeder; M3 is the length of the third horizontal rectangular patch in the first microstrip feeder; M4 is the width of the third horizontal rectangular patch in the first microstrip feeder; M5 is the length of the first horizontal rectangular patch in the first microstrip feeder; M6 is the width of the first horizontal rectangular patch in the first microstrip feeder; T1 is the length of the first vertical rectangular patch in the second microstrip feeder; T2 is the length of the second horizontal rectangular patch in the second microstrip feeder; T3 is the fourth vertical rectangular patch in the second microstrip feeder; T4 is the width of the third vertical rectangular patch in the second microstrip feeder; T5 is the width of the first vertical rectangular patch in the second microstrip feeder; and T6 is the length of the third vertical rectangular patch in the second microstrip feeder.

The invention provides the broadband MIMO antenna with self-decoupling characteristics, comprising the dielectric substrate, the metal patch printed on the upper surface of the dielectric substrate, and the horizontal back-to-back elliptical tapered slots and the vertical elliptical tapered slot etched on the metal patch; the vertical elliptic gradation slot and a pair of horizontal elliptical tapered slots are respectively fed by the micro strip line and the bent micro strip line and the excited horizontal slot characteristic mode and the vertical slot characteristic mode excited by the micro strip line are orthogonal to each other.

The self-decoupling and miniaturized broadband MIMO antenna of the invention based on the mode orthogonal technology firstly obtains the preliminary antenna structure by adding the elliptical tapered slots in the horizontal and vertical axis directions of the circular metal patch, and then adopts the characteristic mode theory to analyze the characteristic mode of the antenna for the purpose of obtaining the characteristic mode current distribution of the antenna, and then elliptical tapered slots are coupled and fed through the bent line and the microstrip line respectively to excite the required orthogonal mode, so as to achieve lower coupling in a wider working frequency band without introducing any additional decoupling structure.

DETAILED DESCRIPTION OF THE EMBODIMENTS

The invention will be further described below in detail through specific embodiments in conjunction with the accompanying drawings.

Figure 1A:
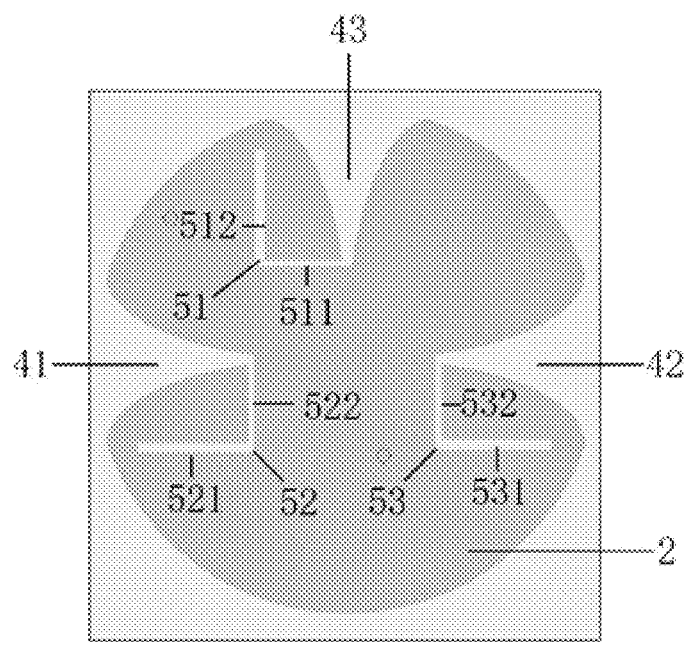
FIG. 1A shows the front view of the broadband MIMO antenna with self-decoupling characteristics in the invention and FIG. 1B is the back view of the broadband MIMO antenna with self-decoupling characteristics in the invention.
Figure 1B:
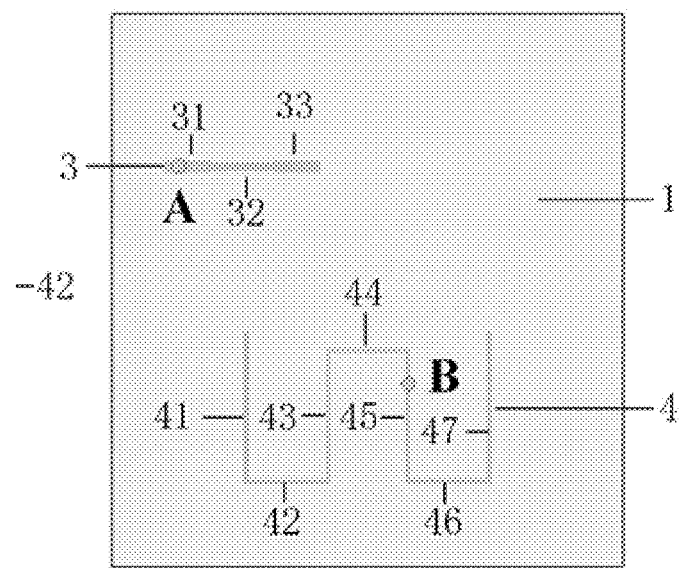

As shown in FIG. 1A and FIG. 1B, the broadband MIMO antenna with self-decoupling characteristics comprises the dielectric substrate 1, the improved circular metal patch 2, the first microstrip feeder 3 and the second microstrip feeder 4; the upper surface of the dielectric substrate 1 is printed with the improved circular metal patch 2, the improved circular metal patch 2 is formed by etching a circular metal patch to be with three elliptical tapered slots (the first elliptical tapered slot 41, the second elliptical tapered slot 42, and the third elliptical tapered slot 43) and three L-shaped slots 5 (the first L-shaped slot 51, the second L-shaped slot 52, and the third L-shaped slot 53); the central axes of the first elliptical tapered slot 41 and the second elliptical tapered slot 42 are located on the horizontal central axis of the improved circular metal patch 2, and the third elliptical tapered slot 43 is located on the vertical central axis of the improved circular metal patch 2; the first L-shaped slot 51 is connected to the third elliptical tapered slot 43, the first L-shaped slot 51 is located in the left of the third elliptical tapered slot 43, and the first L-shaped slot 51 is comprised of the first horizontal rectangular slot 511 and the first vertical rectangular slot 512 that are connected in sequence, and the first vertical rectangular slot 512 is wider than first horizontal rectangular slot 511 and is located on the left side of the first horizontal rectangular slot 511; the second L-shaped slot 52 is composed of the second horizontal rectangular slot 521 and the second vertical rectangular slot 522 that are sequentially connected, and the second vertical rectangular slot 522 is narrower in width than second horizontal rectangular slot 521 and is located on the right side of the second horizontal rectangular slot 521; the third L-shaped slot 53 and the second L-shaped slot 52 are symmetrically distributed about the vertical central axis of the improved circular metal patch 2, and the third L-shaped slot 53 is composed of the third horizontal rectangular slot 531 and the third vertical rectangular slot 532; wherein the first horizontal rectangular slot 511 of the first L-shaped slot 51, the second vertical rectangular slot 522 of the second L-shaped slot 52, and the third vertical rectangular slot 532 of the third L-shaped slot 53 have the same width and length, and the first vertical rectangular slot 511 of the first L-shaped slot 51, the second horizontal rectangular slot 522 of the second L-shaped slot 52, and the third horizontal rectangular slot 531 of the third L-shaped slot 53 have the same width and length; the lower surface of the dielectric substrate 1 is printed with the first microstrip feeder 3 and the second microstrip feeder 4 which are of non-uniform width.

The first microstrip feeder 3 includes the first horizontal rectangular microstrip patch 31, the second horizontal rectangular microstrip patch 32, and the third horizontal rectangular microstrip patch 33 connected in sequence; wherein the second horizontal rectangular microstrip patch 32 has narrow width and is used to connect the first horizontal rectangular microstrip patch 31 and the third horizontal rectangular microstrip patch 33 with the same width; the second microstrip feeder 4 includes the first vertical rectangular microstrip patch 41, the second horizontal rectangular microstrip patch 42, the third vertical rectangular microstrip patch 43, the fourth horizontal rectangular microstrip patch 44, the fifth vertical rectangular microstrip patch 45, the sixth horizontal rectangular microstrip patch 46, and the seventh vertical rectangular microstrip patch 47 connected in sequence; wherein the first vertical rectangular microstrip patch 41 and the seventh vertical rectangular microstrip patch 47 have the same length and width, the second horizontal rectangular microstrip patch 42, the third vertical rectangular microstrip patch 43, and the fourth horizontal rectangular microstrip patch 44, the fifth vertical rectangular microstrip patch 45, and the sixth horizontal rectangular microstrip patch 46 have the same narrow width, the second horizontal rectangular microstrip patch 42 and the sixth horizontal rectangular microstrip patch 46 have the same length, and the third vertical rectangular micro strip patch 43 and the fifth vertical rectangular micro strip patch 45 have the same length.

The first microstrip feeder 3 is used to excite the vertically placed elliptical tapered slots through coupling feed, and the second micro strip feeder 4 is used to excite the two back-to-back elliptical tapered slots which are horizontally placed.

As another embodiment of the invention, the broadband MIMO antenna of the invention includes the dielectric substrate, the improved circular metal patch printed on the upper surface of the dielectric substrate, and a pair of horizontal back-to-back elliptical tapered slots and the vertical elliptical tapered slot etched on the improved circular metal patch; the microstrip line and the bent microstrip line are used to feed the vertical elliptical tapered slot and a pair of horizontal elliptical tapered slots respectively, the characteristic mode of the horizontal slot excited by the bent micro strip line and the vertical slot characteristic modes are orthogonal to each other, and therefore lower coupling between antenna units can be achieved without introducing any additional decoupling structure.

In order to further illustrate the working principle of the self-decoupling of the antenna, the invention uses the microwave studio of the electromagnetic simulation software CST to analyze the characteristic mode of the antenna structure without adding an excitation source. Based on the theory of characteristic mode, the surface current distribution on any ideal conductor can be decomposed into an infinite number of characteristic modes orthogonal to each other. By adopting a suitable feed structure to excite the required modes, the orthogonality between the modes can be utilized to obtain lower coupling. Mode significance (MS) and characteristic angle (CA) are very important parameters in characteristic mode analysis, used to evaluate the contribution of each mode to the total electromagnetic radiation and whether an ideal conductor structure can effectively radiate.

Figure 3A:
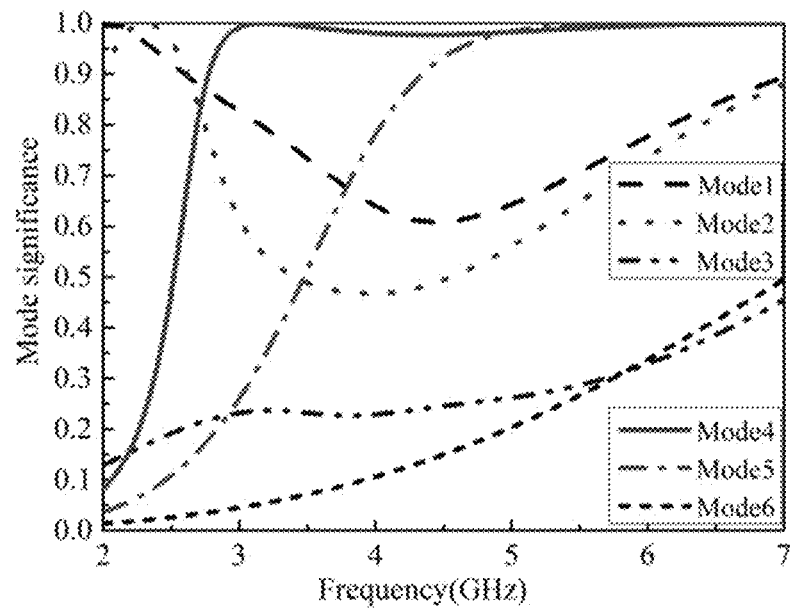
FIG. 3A is a curve showing the change of mode significance (MS) with frequency of the first 6 modes of the broadband MIMO antenna with self-decoupling characteristics according to the invention and FIG. 3B is a curve showing the change of characteristic angle (CA) with frequency of the first 6 modes of the broadband MIMO antenna with self-decoupling characteristics according to the invention.
Figure 3B:
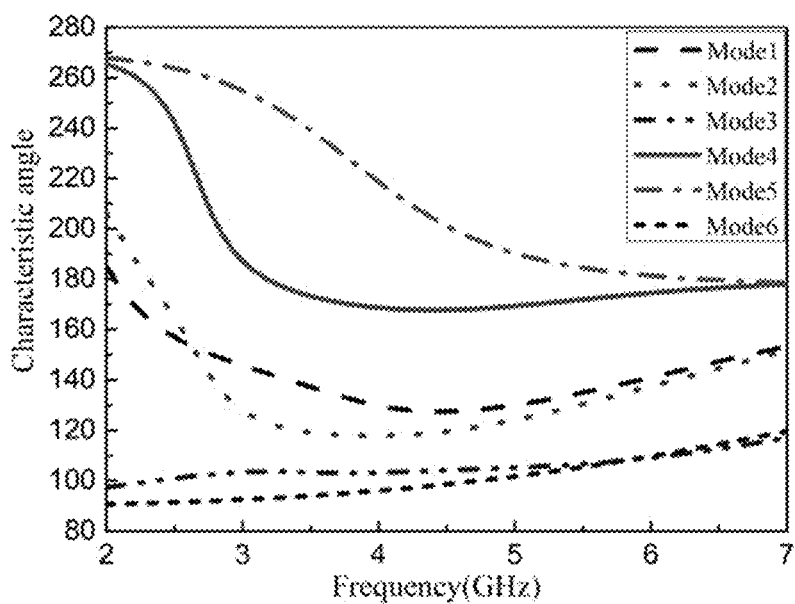
Figure 4A:
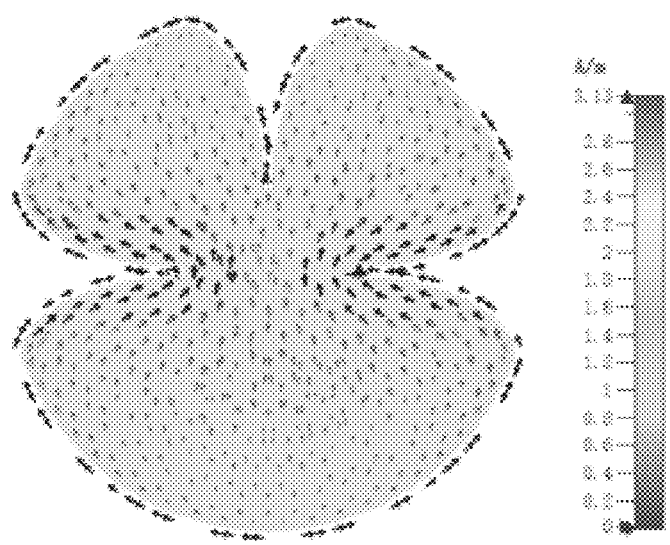
FIG. 4A is a current distribution diagram of the Mode 1 of the broadband MIMO antenna with self-decoupling characteristics at potential resonant frequencies of 2 GHz in the invention.
Figure 4B:
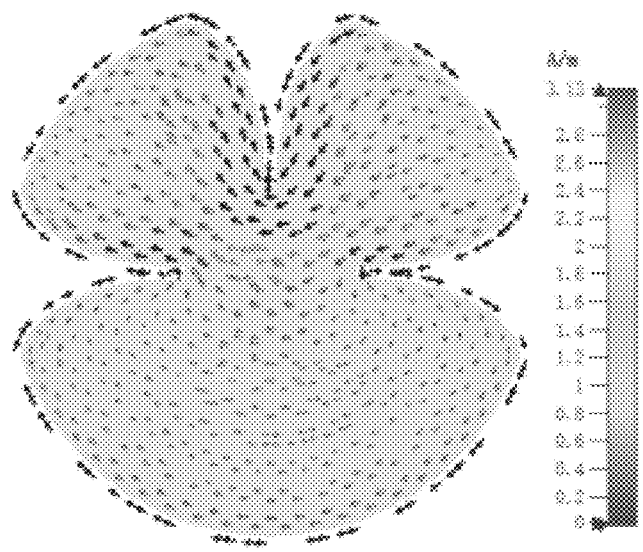
FIG. 4B is a current distribution diagram of the Mode 2 of the broadband MIMO antenna with self-decoupling characteristics at potential resonant frequencies of 2.3 GHz in the invention, FIG. 4C a current distribution diagram of the Mode 4 of the broadband MIMO antenna with self-decoupling characteristics at potential resonant frequencies of 3.17 GHz in the invention.
Figure 4C:
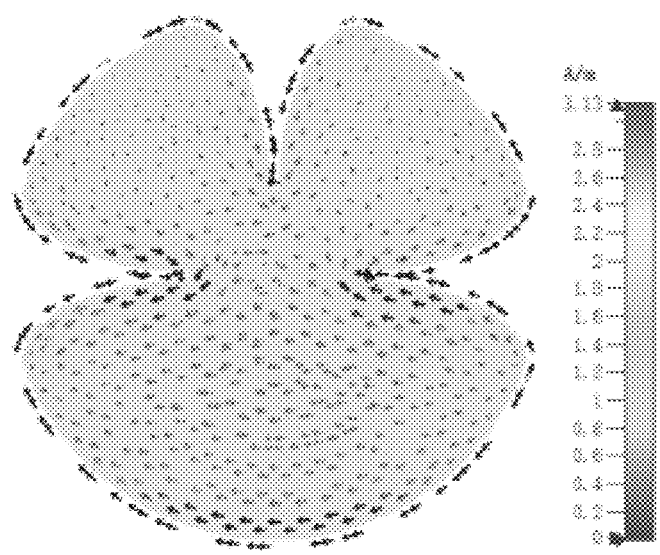
FIG. 4D is a current distribution diagram of the Mode 5 of the broadband MIMO antenna with self-decoupling characteristics at potential resonant frequencies of 6.3 GHz.
Figure 4D:
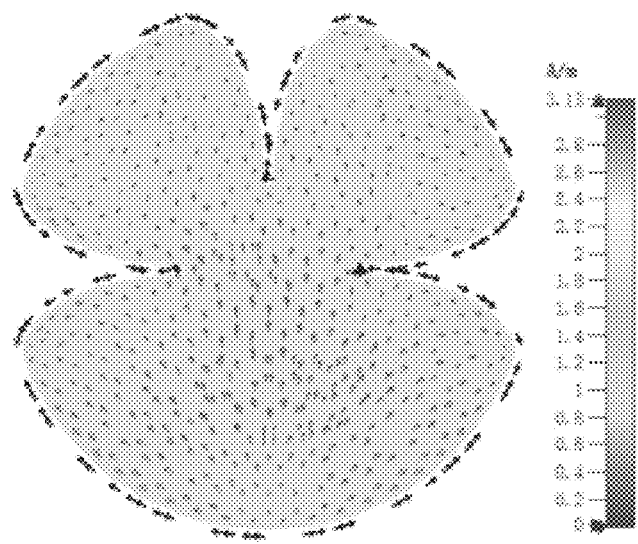
Figure 5:
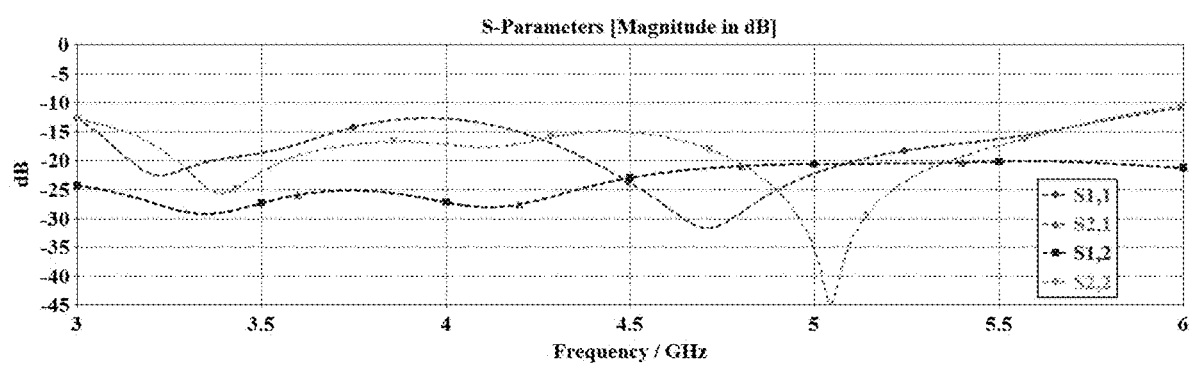
FIG. 5 illustrates simulated S-parameter variation with frequency, including the reflection coefficient of antenna units and the transmission coefficient between antenna units.

FIG. 3A-FIG. 3B show the change of the mode significance (MS) and characteristic angle (CA) of the first 6 modes of the designed antenna with frequency. In theory, the closer the mode significance is to 1 (the closer the characteristic angle is to 180 degrees), the easier it is for the corresponding mode to be excited. It can be seen from the FIG. 3A and FIG. 3B: Mode 1 and Mode 2 are close to the maximum value of 1 at 2 GHz and 2.3 GHz respectively, indicating that these two modes can be excited separately by appropriate feeding; Mode 4 and Mode 5 reach the maximum value of 1 at 3.17 GHz and 6.3 GHz respectively, and the mode significance (MS) value is close to 1 in a wide frequency band, which indicates that these two modes have potential broadband characteristic; although the mode significance (MS) of the other modes increases with the increase of the frequency, the mode significance (MS) in the entire range is still very small, that is, small possibility of resonance.

FIG. 4A-FIG. 4D shows the potential resonant frequencies and current distributions of the designed antenna in the following four modes (namely, Mode 1, Mode 2, Mode 4 and Mode 5). It can be seen that Mode 2 is a vertical tapered slot mode, in which the current is mainly distributed on the edge of the vertical elliptical slot, and the current has approximately equal amplitude and opposite phase. Mode 4 is a horizontal tapered slot mode, in which the current is mainly distributed on the edges of the two elliptical slots, and the currents on the upper and lower edges of the two slots have approximately equal amplitude and opposite phase. The currents of Mode 1 and Mode 5 are mainly distributed on the edges of the two elliptical tapered slots and the current phases are the same. At the same time, Mode 1 and Mode 5 have opposite phases of currents at the edges of the two elliptical slots.

The vertical tapered slot mode 2 can be obtained by the coupling feed excitation of the microstrip line at point A in FIG. 1B, while the horizontal slot Mode 4, is obtained by exciting at point B (FIG. 1B) of the bent microstrip line. Due to the orthogonality of the vertical tapered slot mode (Mode 2) and the horizontal slot mode (Mode 4), low coupling between ports can be obtained.

Figure 2A:
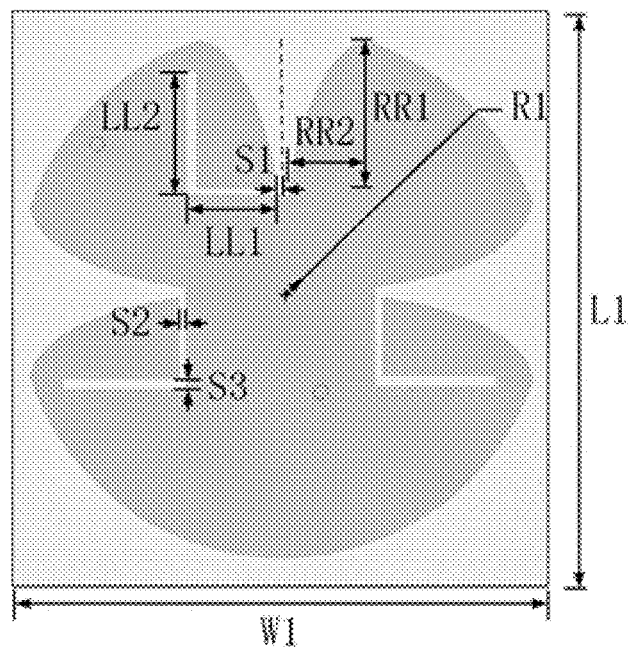
FIG. 2A is a front view of the antenna' dimension in an embodiment of the invention and FIG. 2B is a back view of the antenna's dimension in an embodiment of the invention.
Figure 2B:
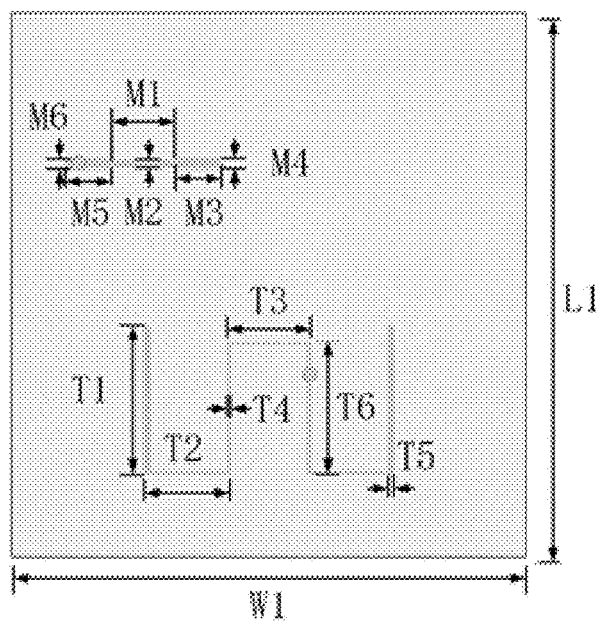

The material of the dielectric substrate 1 used in the invention is Rogers RO4350B, its relative permittivity is $\varepsilon$=3.66, and the thickness h=0.508 mm. The size parameters of the broadband MIMO antenna with self-decoupling characteristics of the invention are shown in FIG. 2A and FIG. 2B, and the values of the parameters indicated in the FIG. 3A and FIG. 3B are as follows: R1: 29.5-32.5 mm; W1: 62-70 mm; L1: 65-75 mm; RR2: 10-29 mm; RR1: 18.3-28.3 mm; S1: 0.6-1.5 mm; LL1: 5-18 mm; LL2: 10-18 mm; S2: 0.5-1.5 mm; S3: 0.5-1.5 mm; M1: 4-12 mm; M2: 0.5-1.5 mm; M3: 5-12 mm; M4: 1-2 mm; M5: 4-8 mm; M6: 1-2 mm; T1: 16.3-22.3 mm; T2: 7-13 mm; T3: 10.5-13.9 mm; T4: 0.1-0.5 mm; T5: 0.3-1 mm; T6: 10-20 mm. The above optimal values are as follows: R1: 32.5 mm; W1: 65 mm; L1: 70 mm; RR2: 10 mm; RR1: 20.3 mm; S1: 0.55 mm; LL1: 11 mm; LL2: 14 mm; S2: 0.75 mm; S3: 1 mm; M1: 8 mm; M2: 1 mm; M3: 6 mm; M4: 1.5 mm; M5: 6 mm; M6: 1.5 mm; T1: 19 mm; T2: 10.3 mm; T3: 10.5 mm; T4: 0.3 mm; T5: 0.5 mm; T6: 17 mm. Specifically, R1 is the radius of the improved circular metal patch; W1 is the width of the dielectric substrate; L1 is the length of the dielectric substrate; RR2 is the short radius of the elliptical slots; RR1 is the long radius of the elliptical slots; S1 is the half of the initial distance of the elliptical tapered slots; LL1 is the length of the horizontal rectangular slot of the first L-shaped slot; LL2 is the length of the vertical rectangular slot of the first L-shaped slot; S2 is the width of the horizontal rectangle of the first L-shaped slot; S3 is the width of the vertical rectangular groove of the first L-shaped slot; M1 is the length of the second horizontal rectangular patch in the first microstrip feeder; M2 is the width of the second horizontal rectangular patch in the first microstrip feeder; M3 is the length of the third horizontal rectangular patch in the first microstrip feeder; M4 is the width of the third horizontal rectangular patch in the first microstrip feeder; M5 is the length of the first horizontal rectangular patch in the first microstrip feeder; M6 is the width of the first horizontal rectangular patch in the first microstrip feeder; T1 is the length of the first vertical rectangular patch in the second microstrip feeder; T2 is the length of the second horizontal rectangular patch in the second microstrip feeder; T3 is the fourth vertical rectangular patch in the second microstrip feeder; T4 is the width of the third vertical rectangular patch in the second microstrip feeder; T5 is the width of the first vertical rectangular patch in the second microstrip feeder; and T6 is the length of the third vertical rectangular patch in the second microstrip feeder.

The improved circular metal patch in the invention is obtained by etching the circular metal patch to be with three elliptical tapered slots and three L-shaped slots, and the three elliptical tapered slots can also be replaced with other ones with slots with broadband effects, such as exponential tapered slots.

The invention has a low profile, simple structure, and wide impedance bandwidth. In addition to covering the commonly used 4G communication frequency band, the invention can also effectively cover the commonly used sub-6 GHz working frequency band of 5G, which is more convenient for integration with microwave circuits. In addition, the invention realizes the orthogonal modes by applying a pair of back-to-back elliptical tapered slots in the direction of the horizontal central axis of the circular patch and the single elliptical tapered slot in the direction of the vertical central axis and uses them radiating units so that lower coupling is achieved in a wide frequency band of 3-6 GHz without any additional decoupling structure.

The above descriptions are only the preferred embodiments of the invention and are not intended to limit the invention. Any modification, equivalent replacement and improvement made within the spirit and principle of the invention shall be included in the protection scope of the invention.

What is claimed is:
1. A broadband multiple-input multiple-output (MIMO) antenna with self-decoupling characteristics, comprising: a dielectric substrate, a metal patch, a first microstrip feeder and a second microstrip feeder;
   wherein the metal patch is printed on an upper surface of the dielectric substrate, and the metal patch is formed by etching a circular metal patch to be with three elliptical tapered slots and three L-shaped slots;
   wherein each of the first microstrip feeder and the second microstrip feeder has a non-uniform width and is printed on a lower surface of the dielectric substrate.

2. The broadband MIMO antenna with self-decoupling characteristics according to claim 1, wherein the three elliptical tapered slots comprise a first elliptical tapered slot, a second elliptical tapered slot, and a third elliptical tapered slot; central axes of the first elliptical tapered slot and the second elliptical tapered slot are located on a horizontal central axis of the metal patch, and the third elliptical tapered slot is located on a vertical central axis of the metal patch.

3. The broadband MIMO antenna with self-decoupling characteristics according to claim 2, wherein the three L-shaped slots comprise a first L-shaped slot, a second L-shaped slot, and a third L-shaped slot;
   wherein the first L-shaped slot is connected to the third elliptical tapered slot and located on the left side of the third elliptical tapered slot, the first L-shaped slot comprises a first horizontal rectangular slot and a first vertical rectangular slot connected in sequence, and the first vertical rectangular slot is located on the left side of the first horizontal rectangular slot;
   wherein the second L-shaped slot comprises a second horizontal rectangular slot and a second vertical rectangular slot connected in sequence, and the second vertical rectangular slot is located on the right side of the second horizontal rectangular slot;
   wherein the third L-shaped slot and the second L-shaped slot are symmetrically arranged about the vertical central axis of the metal patch, and the third L-shaped slot comprises a third horizontal rectangular slot and a third vertical rectangular slot;
   wherein the first horizontal rectangular slot of the first L-shaped slot, the second vertical rectangular slot of the second L-shaped slot, and the third vertical rectangular slot of the third L-shaped slot have the same width and the same length;
   wherein the first vertical rectangular slot of the first L-shaped slot, the second horizontal rectangular slot of the second L-shaped slot, and the third horizontal rectangular slot of the third L-shaped slot have the same width and the same length.

4. The broadband MIMO antenna with self-decoupling characteristics according to claim 3, wherein the first microstrip feeder comprises a first horizontal rectangular microstrip patch, a second horizontal rectangular microstrip patch, and a third horizontal rectangular microstrip patch sequentially connected in that order;
   wherein the second horizontal rectangular microstrip patch is used to connect the first horizontal rectangular microstrip patch and the third horizontal rectangular microstrip patch, and the first horizontal rectangular microstrip patch and the third horizontal rectangular microstrip patch have the same width.

5. The broadband MIMO antenna with self-decoupling characteristics according to claim 4, wherein the second microstrip feeder comprises a first vertical rectangular microstrip patch, a second horizontal rectangular microstrip patch, a third vertical rectangular microstrip patch, a fourth horizontal rectangular microstrip patch, a fifth vertical rectangular microstrip patch, a sixth horizontal rectangular microstrip patch and a seventh vertical rectangular microstrip patch sequentially connected in that order;
   wherein the first vertical rectangular microstrip patch and the seventh vertical rectangular microstrip patch have the same length and the same width, the second horizontal rectangular microstrip patch, the third vertical rectangular microstrip patch, the fourth horizontal rectangular microstrip patch, the fifth vertical rectangular microstrip patch, and the sixth horizontal rectangular microstrip patch have the same width;

wherein the second horizontal rectangular microstrip patch and the sixth horizontal rectangular microstrip patch have the same length, and the third vertical rectangular microstrip patch and the fifth vertical rectangular microstrip patch have the same length.

6. The broadband MIMO antenna with self-decoupling characteristics according to claim 5, wherein the first microstrip feeder is configured to excite the elliptical tapered slot placed vertically through coupling feed; and the second microstrip feeder is configured to excite the elliptical tapered slots placed horizontally and back-to-back in pair.

7. The broadband MIMO antenna with self-decoupling characteristics according to claim 1, wherein a material of the dielectric substrate 1 is Rogers RO4350B, a relative dielectric constant of the dielectric substrate is ε=3.66, and a thickness of the dielectric substrate is h=0.508 mm.

8. The broadband MIMO antenna with self-decoupling characteristics according to claim 1, wherein R1 is 29.5-32.5 mm; W1 is 62-70 mm; L1 is 65-75 mm; RR2 is 10-29 mm; RR1 is 18.3-28.3 mm; S1 is 0.6-1.5 mm; LL1 is 5-18 mm; LL2 is 10-18 mm; S2 is 0.5-1.5 mm; S3 is 0.5-1.5 mm; M1 is 4-12 mm; M2 is 0.5-1.5 mm; M3 is 5-12 mm; M4 is 1-2 mm; M5 is 4-8 mm; M6 is 1-2 mm; T1 is 16.3-22.3 mm; T2 is 7-13 mm; T3 is 10.5-13.9 mm; T4 is 0.1-0.5 mm; T5 is 0.3-1 mm; T6 is 10-20 mm;

where R1 is a radius of the metal patch; W1 is a width of the dielectric substrate; L1 is a length of the dielectric substrate; RR2 is a short radius of the elliptical tapered slots; RR1 is a long radius of the elliptical tapered slots; S1 is the half of an initial distance of the elliptical tapered slots; LL1 is a length of a horizontal rectangular slot of a first one of the L-shaped slots; LL2 is a length of a vertical rectangular slot of the first one of the L-shaped slots; S2 is a width of the horizontal rectangle of the first one of the L-shaped slots; S3 is a width of the vertical rectangular groove of the first one of the L-shaped slots; M1 is a length of a second horizontal rectangular patch of the first microstrip feeder; M2 is a width of the second horizontal rectangular patch of the first microstrip feeder; M3 is a length of a third horizontal rectangular patch of the first microstrip feeder; M4 is a width of the third horizontal rectangular patch of the first microstrip feeder; M5 is a length of a first horizontal rectangular patch of the first microstrip feeder; M6 is a width of the first horizontal rectangular patch of the first microstrip feeder; T1 is a length of a first vertical rectangular patch of the second microstrip feeder; T2 is a length of a second horizontal rectangular patch of the second microstrip feeder; T3 is a fourth vertical rectangular patch of the second microstrip feeder; T4 is a width of a third vertical rectangular patch of the second microstrip feeder; T5 is a width of the first vertical rectangular patch of the second microstrip feeder; and T6 is a length of the third vertical rectangular patch of the second microstrip feeder.

* * * * *